Patented Nov. 14, 1922.

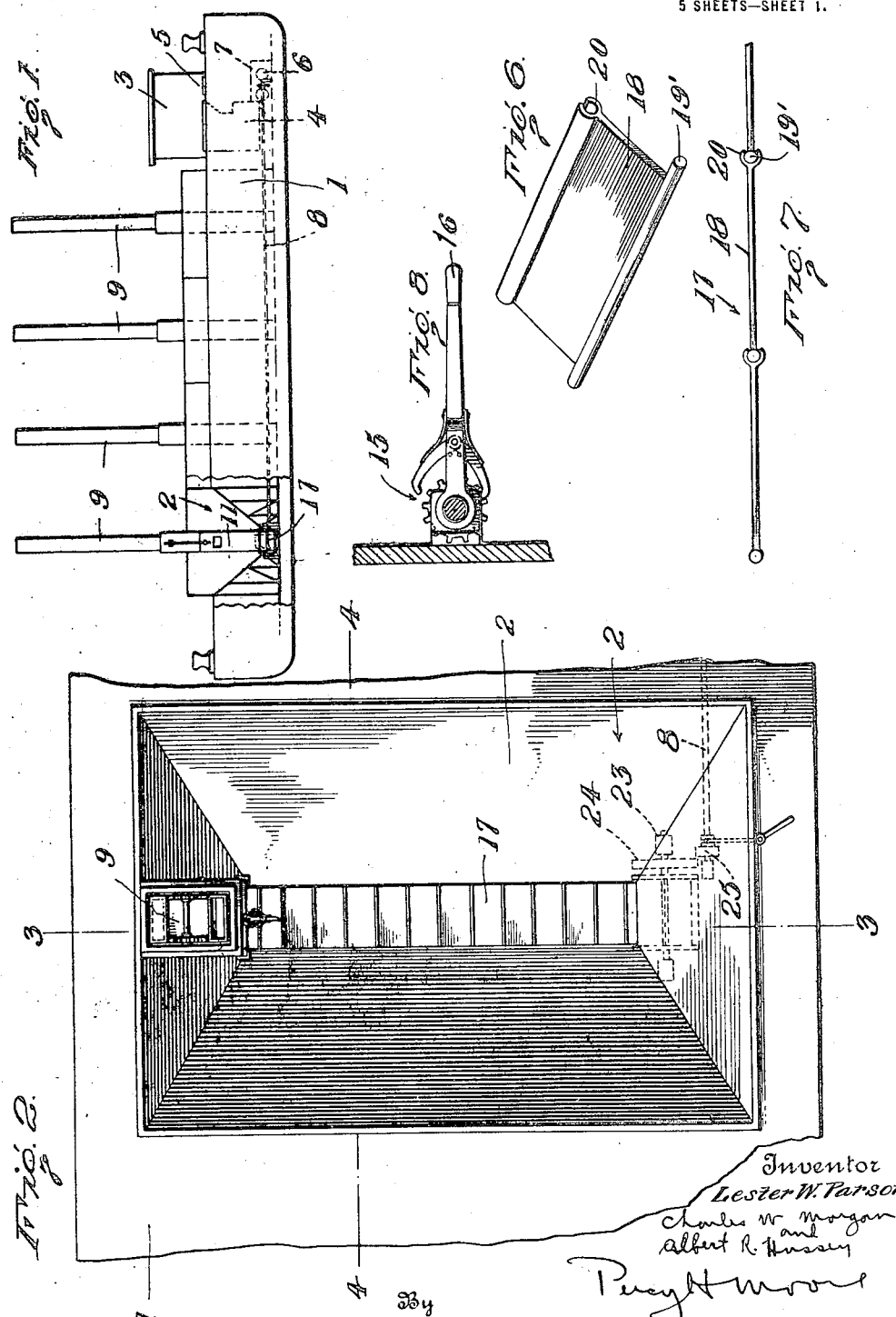

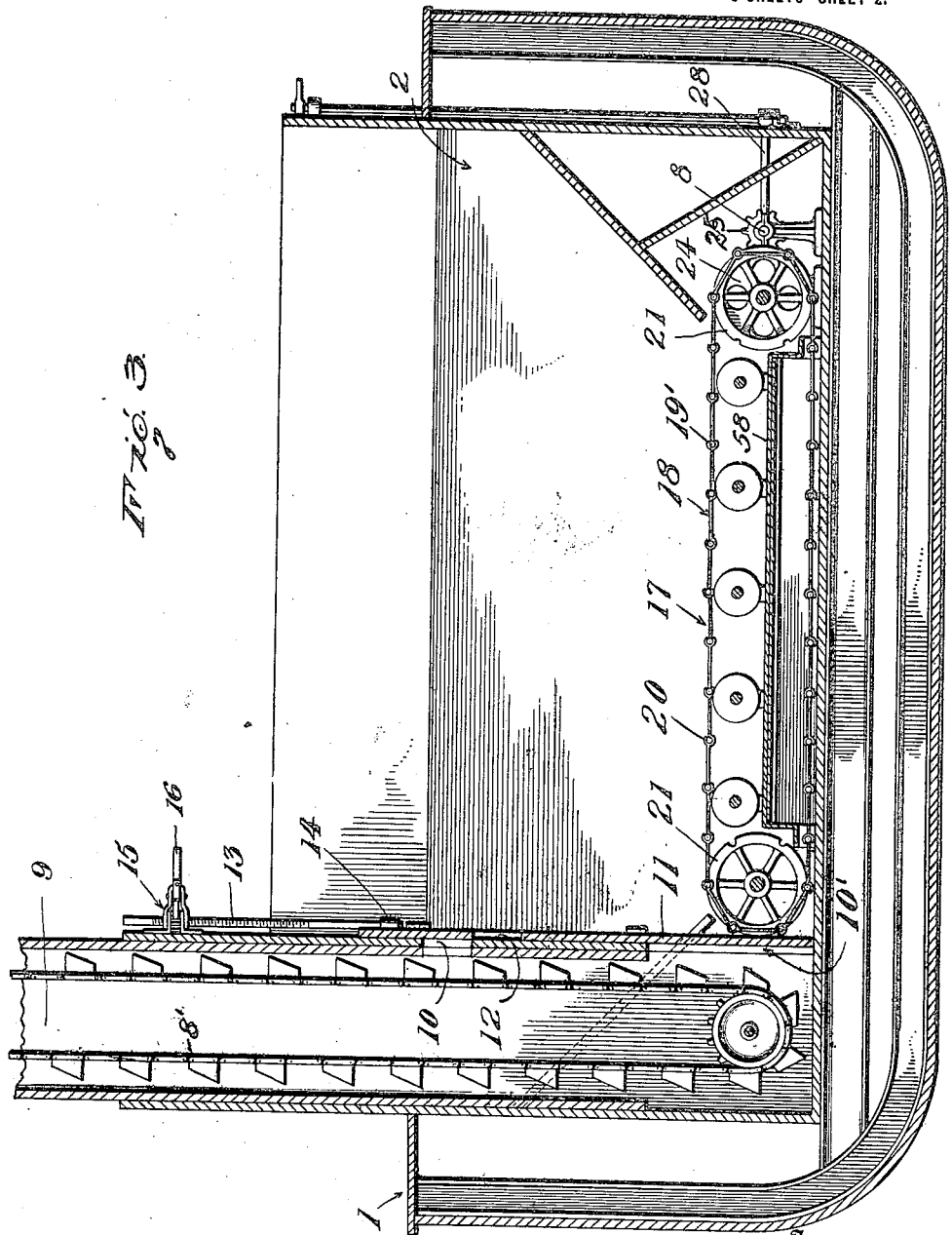

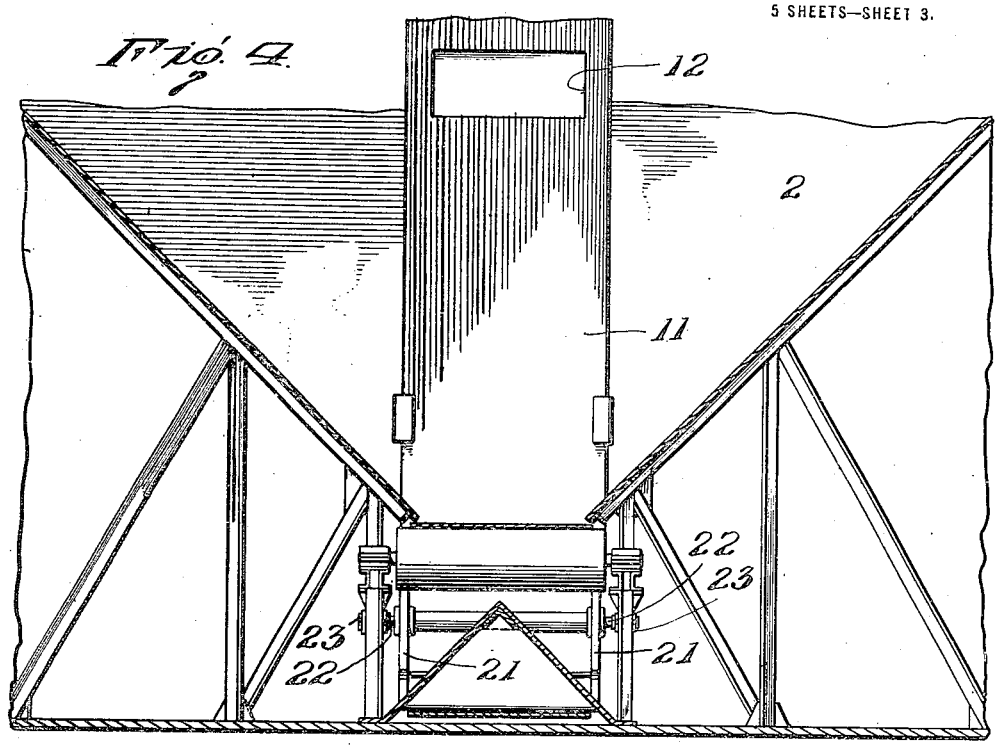
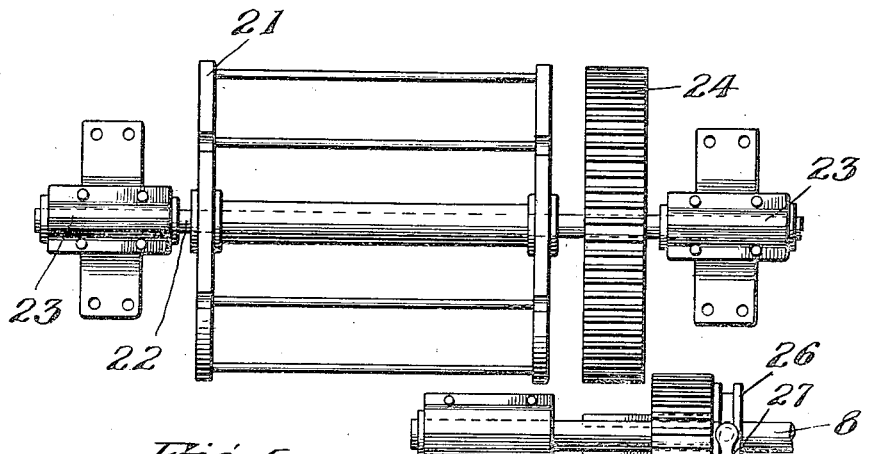

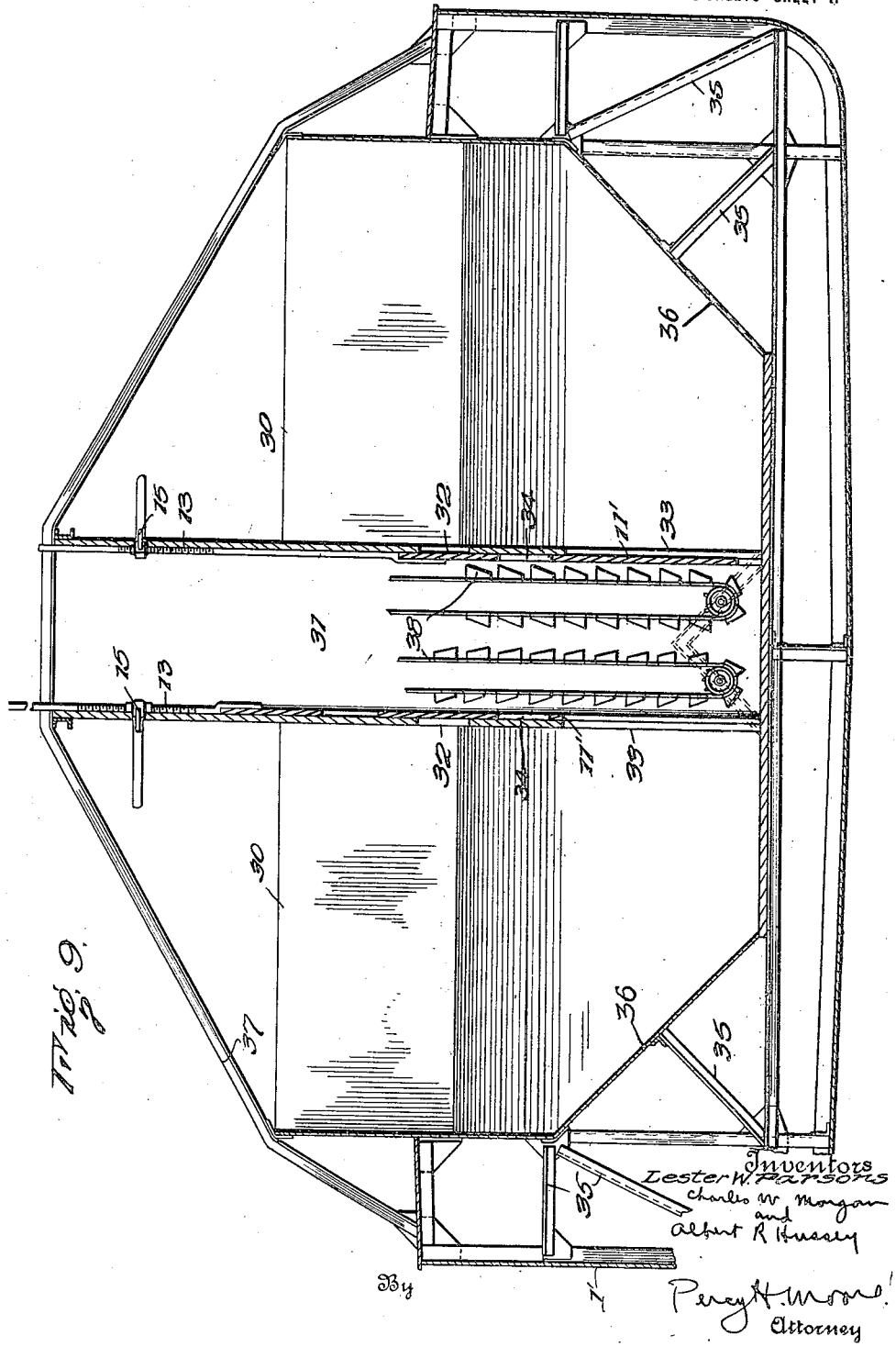

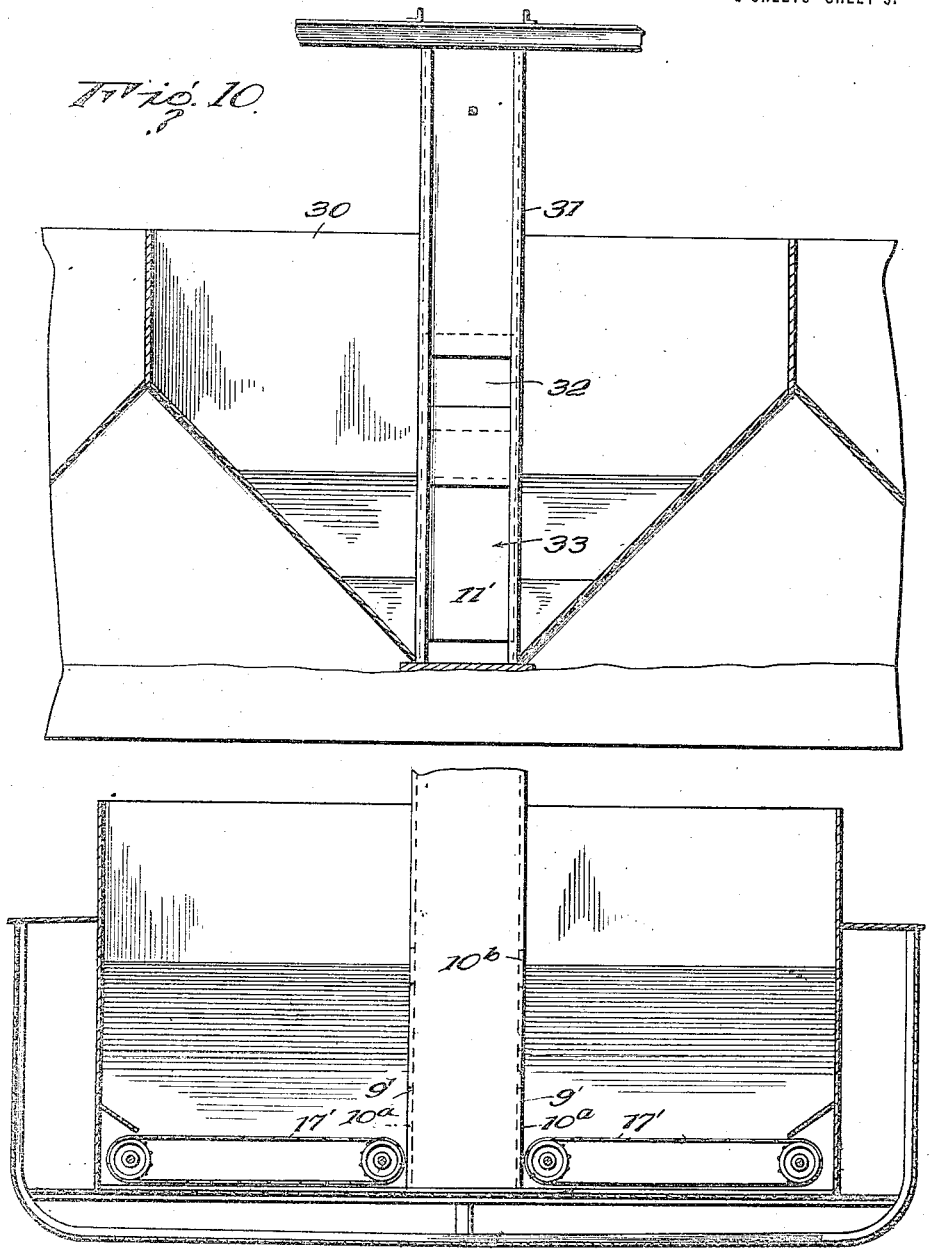

1,435,730

UNITED STATES PATENT OFFICE.

LESTER W. PARSONS AND CHARLES W. MORGAN, OF CRISTOBAL, CANAL ZONE, AND ALBERT R. HUSSEY, OF BOSTON, MASSACHUSETTS.

COAL-LOADING DEVICE.

Application filed March 6, 1920. Serial No. 363,910.

*To all whom it may concern:*

Be it known that (1) LESTER W. PARSONS, (2) CHARLES W. MORGAN, and (3) ALBERT R. HUSSEY, citizens of the United States of America, residing at (1) and (2) Cristobal, Canal Zone, and (3) at 284 Huntington Ave., Boston, in the county of Suffolk and State of Massachusetts, have invented certain new and useful Improvements in Coal-Loading Devices, of which the following is a specification.

This invention relates to improvements in loading devices and the invention has for its dominant object to provide an improved form of loader especially adapted for use in the coaling of ships, but capable of being employed in the handling of coal or any loose material for various purposes or use.

An important characteristic feature of the invention resides in the provision of a novel form of fuel hoppers or pockets and elevating means whereby the coal can be discharged from the pockets into engagement with the elevating means at the will of the operator, the construction of the pockets being such as will ensure the passage of coal or other material therefrom and also to permit of their individual or collective operation.

Other objects and characteristics of the invention will be in part obvious and in part pointed out hereinafter.

In order that the invention and the manner of its operation may be readily understood by workers skilled in the art, we have in the accompanying illustrative drawings and in the following detailed description based thereon, set out one embodiment of the invention.

In these drawings:

Figure 1 is a semi schematic view in longitudinal section, showing the invention applied to a barge;

Figure 2 is a top plan of one of the pockets and its elevator;

Figure 3 is a fragmentary vertical transverse section thru said pocket, taken on the line 3—3 of Figure 2;

Figure 4 is a fragmentary longitudinal section taken on the line 4—4 of Figure 2;

Figure 5 is a detail in elevation illustrating one of the pocket conveyor sprockets and the means for driving the same;

Figure 6 is a detail in perspective of one of the conveyor belt links;

Figure 7 is a fragmentary elevation of a portion of the conveyor belt;

Figure 8 is a detail in elevation of the operating lever;

Figure 9 is a fragmentary vertical section thru a barge showing a slightly modified form of the invention;

Figure 10 is a similar view of a further modification of the invention; and

Figure 11 is a longitudinal section taken at right angles to the Figure 10.

Having more particular reference to the drawings, in connection with which like reference characters will designate corresponding parts, it will be seen upon reference to the drawings that we have shown the improved loading means applied to a barge for ship coaling purposes, said barge being indicated in its entirety by the numeral 1, and having a series of pockets 2 disposed longitudinally thereof in juxtaposed relation as shown in Figure 1, while an engine room 3 is provided, containing the usual steam boiler 4 or other source of energy, steam-electric generating equipment 5, conveyor engine 6 etc. The engine 6 is supplied with suitable power transmission housed at 7 and having connection with a driving shaft 8 extending longitudinally of the barge and arranged parallel to the sides thereof. Elevators 8' preferably of the endless type are positioned adjacent said pockets and, as will be hereinafter described in detail, serve to elevate coal therefrom, to the bunkers of a ship or to any desired point. Any number of these elevators may be employed; one may be provided for each of the pockets 2 or one or more portable elevators may be employed in lieu thereof and capable of being shifted from one pocket to another.

The pockets 2, which are formed with upwardly diverging sides, are each provided with a well or receiving compartment 9 into which coal from its pocket is adapted to be discharged, passing from the pocket by way of an opening 10 in the wall thereof, which opening is adapted to be controlled by vertical slidable gate 11 secured to said wall and formed with an opening 12 corresponding to the opening 10 and registrable therewith, at times; a screw threaded shaft 13 is connected to said gate at 14 and passes upwardly thru a double ratchet 15 secured to the barge construction at a convenient point and operable by a lever 16. Thus, rocking of the lever 16 effects raising or lowering of the gate. In this connection, it will be also noted that the end wall to which the gate is secured has a larger opening 10' formed in the lower part thereof in order that coal in greater bulk can be discharged in the well when desired.

Into the wells provided in each of the coal pockets extend the lower ends of the elevators 8', thus affording means whereby the coal discharged thereinto can be removed and conveyed to the bunkers of the ship being coaled or to any desired point.

A conveyor 17 of the endless belt type is arranged at the open constructed bottom of each of the pockets 2 and by reason of the longitudinal disposition with respect to the end wall having the discharge openings therein, will serve as means for conveying coal from its respective pocket. The belts of these conveyors 17 are formed from a plurality of pivotally interconnected links 18, one side of each of which carries trunnion 19', while the remaining side carries a jaw 20 for receiving the trunnion of the following link 18. Sprockets 21 mounted on shafts 22 at each end of the pockets in bearings 23 serve to support said belts forming the conveyors; one of each set of shafts provided to the conveyors, carries a gear 24, which gear, in turn, is adapted to mesh with a pinion 25 splined to the adjacent portions of the drive shaft 8 and in this way be driven from said drive shaft 8 at the will of an operator. Each of the slidable pinions 25 is provided with collar 26 loosely engaged by the yoke 27 of levers 28 extending to points on the barge where they can be conveniently operated. Thus it will be understood that the conveyors in the various pockets 2 may be operated individually or collectively, such as conditions or preference may dictate.

As means for preventing deposits of coal, coal-dust or other material on the undersides of the belts 18 of the conveyor 17, we may and preferably do provide tapered shields 58, arranging said shields to cover the entire undersides of the belt.

The operation of the loader may be reviewed as follows:

Assuming that the pockets 2 are filled with coal and it is desired to remove the same to the bunkers of a ship, the elevators 8' are placed in position by suitable driving means (not shown) whereupon the gates 11 of the pockets are raised in the manner heretofore described until the opening 12 registers with the opening 10. At this time coal will discharge from the pockets into their respective wells from where it will be removed by the buckets of the elevators 8' to the ship's bunkers. As the level of coal in said pockets falls to the openings 10 and 12 and the passage of the same by gravity therethru gradually diminishes, the conveyors 17 in the pockets are operated by meshing the shiftable pinion 25 with the gears 24 thus transmitting motion from the driving shaft 8 to said conveyors 17 and causing the coal in the pockets to be carried forward to the openings 10 and 12. To further facilitate the discharge of coal from the pockets 2 the gates 11 can be raised higher so as to expose the openings 10' in the bottoms of the previously mentioned end walls.

By the use of my improved loader, it will be appreciated that a ship can be coaled much more quickly than it could with the heretofore prevalent devices. Coal can be discharged into the bunkers by way of all of the hatchways therein, merely by employing a corresponding number of pockets 2 and elevators 8'. However, the number of elevators used can be varied as required or desired, and in some instances it may be desired to employ one or two portable elevators which can be moved from one pocket to another.

Instead of arranging the wells 9 at the ends of the pockets 2 in the barge we may locate the same intermediate the ends of the pocket, as shown in the Figure 11, the pocket being indicated by the numeral 9'. In this arrangement, endless conveyors 17' constructed in a like manner to the conveyors 17 are positioned in each of the opposite disposed pocket portions and operate to convey coal to their respective wells 9' and to discharge the same thereinto by way of openings $10^a$ formed in the adjacent sides thereof. Smaller openings $10^b$ are also formed in the sides of the well adjacent the opposite pocket portions and serve for a purpose corresponding to the openings 10' in the wells 9. This construction and arrangement of pockets and conveyors will be found especially advantageous in barges of great breadth, or beam. In this connection, it will be appreciated that the wells 9' are of a size such as will accommodate the quantity of coal discharged therein.

In other types of barges it may be found desirable to dispense with conveyors for carrying coal to the wells and with this in mind we provide means as illustrated in the Figure 9 wherein transverse pairs of oppositely disposed pockets 30 are formed in the barge 1', having wells 31 located between the same and communicating therewith by way of openings 32 and 33 formed in opposite sides of the wells, the openings 32 being formed in the intermediate portions of the wells, while the openings 33 are formed in the lower ends of the well sides and are larger than the openings 32 whereby to permit of the discharge of coal in greater bulk when desired. A slidable gate 11' is engaged with each of the adjacent sides of the well and has an opening 34 therein for alignment with the corresponding opening 32, while the lower portion of said gate serves to normally close the opening 33. Suitable means such as the shaft 13 and the ratchet 15 are supplied to each of the gates 11' and obviously afford means whereby said gates may be raised and lowered.

The pockets 30, as will be noted, have therein walls braced in a suitable manner by trusses generally indicated by the numeral 35, while the lower portions of each of said walls are inclined as at 36 in order that the coal contained therein will tend to move downwardly and outwardly thru the discharge openings 32 and 33 when the gates 11' are moved to open positions with respect thereto. Also the top of the pockets are trussed by beams 37 having their outer ends anchored to the body or hull of the vessel and their inner ends anchored to the adjacent sides of the wells 31.

It will be understood that the coal or other matter contained in the pockets 30 will by reason of its weight and also by gravity pass thru the openings in the adjacent sides of their respective wells, a smaller amount discharging thru the openings 32 and a greater amount thru the openings 33 into said wells where it will be engaged and elevated to the desired point of discharge by elevating means designated in its entirety by the character 38. In this construction, the use of conveyors can be eliminated.

Manifestly, the construction shown is capable of considerable modification, and such modification as is within the scope of our claims, we consider within the spirit of our invention.

What we claim is:

1. In a loading device, a body, a plurality of pockets therein, a well adjacent each pocket, an elevator in each well, said wells having intermediate and lower openings communicating with said pockets, means controlling both openings, said intermediate opening being adapted to permit the material in said pockets to be discharged by gravity directly to said elevators, and means in said pockets for discharging the material through the said lower opening to said wells.

2. In a loading device, a body having a plurality of pockets therein, conveyors in the bottoms of said pockets, means for operating the conveyors individually or collectively, elevators for receiving material from the pockets, and means adjacent each of said pockets independently operable for controlling the discharge of material directly onto the elevators, said means also controlling the discharge of material to the wells to be subsequently picked up by said elevators.

3. In a loading device, a body having a plurality of pockets therein and wells adjacent certain of the ends of said pockets, said wells having openings in their intermediate and lower portions communicating with said pockets, gates slidable on said wells having openings therein corresponding to the openings in the intermediate portions of the wells, conveyors in the bottom of the pockets, and means for permitting raising of said gates, first to fully expose the openings in the intermediate portions of said wells and subsequently to fully expose the openings in the lower portions of the wells.

4. In a loading device, a body having a series of pockets therein and wells adjacent certain of the ends of said pockets, said wells having openings in the intermediate and lower portions thereof communicating with said pockets, slidable gates adjacent said wells having openings therein for registration with the openings in the intermediate portions of said wells, screw threaded shafts connected to said gates, means for causing rotation of said shafts to raise said gates, first to expose the intermediate openings and subsequently the lower openings in said wells, and conveyors in the bottom of said pockets, means for individually or selectively operating said conveyors.

In testimony whereof we affix our signatures in presence of two witnesses.

LESTER W. PARSONS.
CHAS. W. MORGAN.
ALBERT R. HUSSEY.

Witnesses for Lester W. Parsons and Chas. W. Morgan:
C. C. BAILEY,
C. H. NICHOLLS.

Witnesses for Albert R. Hussey:
PAUL DILLON,
ERNEST W. DORIS.